United States Patent [19]
Clark

[11] 3,857,156
[45] Dec. 31, 1974

[54] METHOD OF MAKING TETRAFLUOROETHYLENE SEALING ELEMENTS WITH HYDRODYNAMIC ACTION

[75] Inventor: William E. Clark, Chelsea, Calif.

[73] Assignee: Federal-Mongul Corporation, Southfield, Mich.

[22] Filed: Dec. 19, 1973

[21] Appl. No.: 426,373

[52] U.S. Cl. ............... 29/417, 29/148.4 S, 29/511, 29/DIG. 15, 29/DIG. 34, 264/154, 264/159, 264/295

[51] Int. Cl. ........................................ B23p 17/00

[58] Field of Search ....... 29/417, 511, 148.4 S, 557, 29/558, 200 B, DIG. 3, DIG. 15, DIG. 34; 264/159, 154, 295; 10/86 B, 73

[56] References Cited
UNITED STATES PATENTS

| | | | |
|---|---|---|---|
| 1,936,804 | 11/1933 | Stein | 29/DIG. 34 UX |
| 1,941,025 | 12/1933 | Stein | 277/184 |
| 2,802,513 | 8/1957 | Stoeckel et al. | 264/159 X |
| 3,032,825 | 5/1962 | Proud | 264/159 |
| 3,137,935 | 6/1964 | Gachot | 29/417 X |
| 3,382,567 | 5/1968 | Schaeffler | 29/522 |
| 3,549,445 | 12/1970 | McMahon | 29/511 X |

Primary Examiner—C. W. Lanham
Assistant Examiner—Victor A. DiPalma
Attorney, Agent, or Firm—Owen, Wickersham & Erickson

[57] ABSTRACT

A method for manufacturing an oil seal element from polytetrafluoroethylene and the like. A tubular billet is provided with inner and outer cylindrical surfaces of desired final dimensions and is then faced off on one end wall perpendicular to the cylindrical surfaces. A spiral groove leading from the innermost periphery of the face for a desired distance outwardly is next machined in the faced end wall. A washer of a desired thickness having the spiral groove on one of its faces is then sliced from the billet, thereby also facing the billet for a similar sequence of machining a groove and slicing off washers. Each washer is formed under pressure to permanently deform it, so that the radially inner portion is frustoconical, the outer portion remaining flat.

6 Claims, 6 Drawing Figures

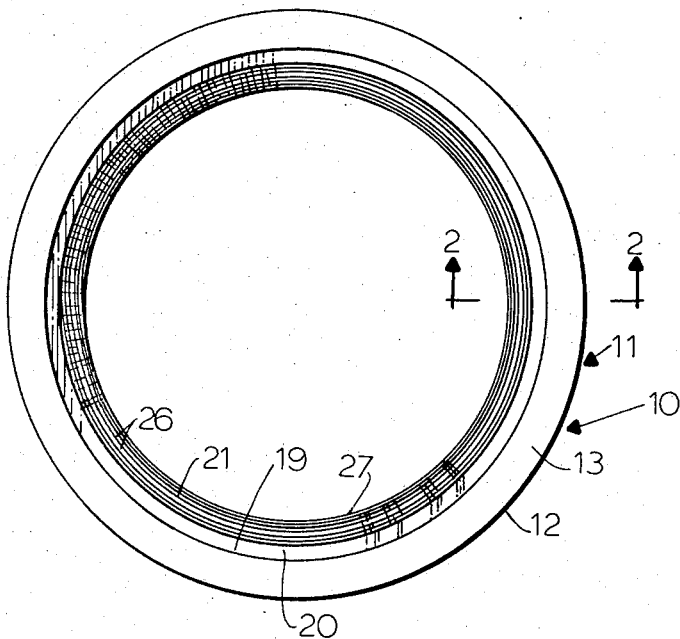
FIG. 1
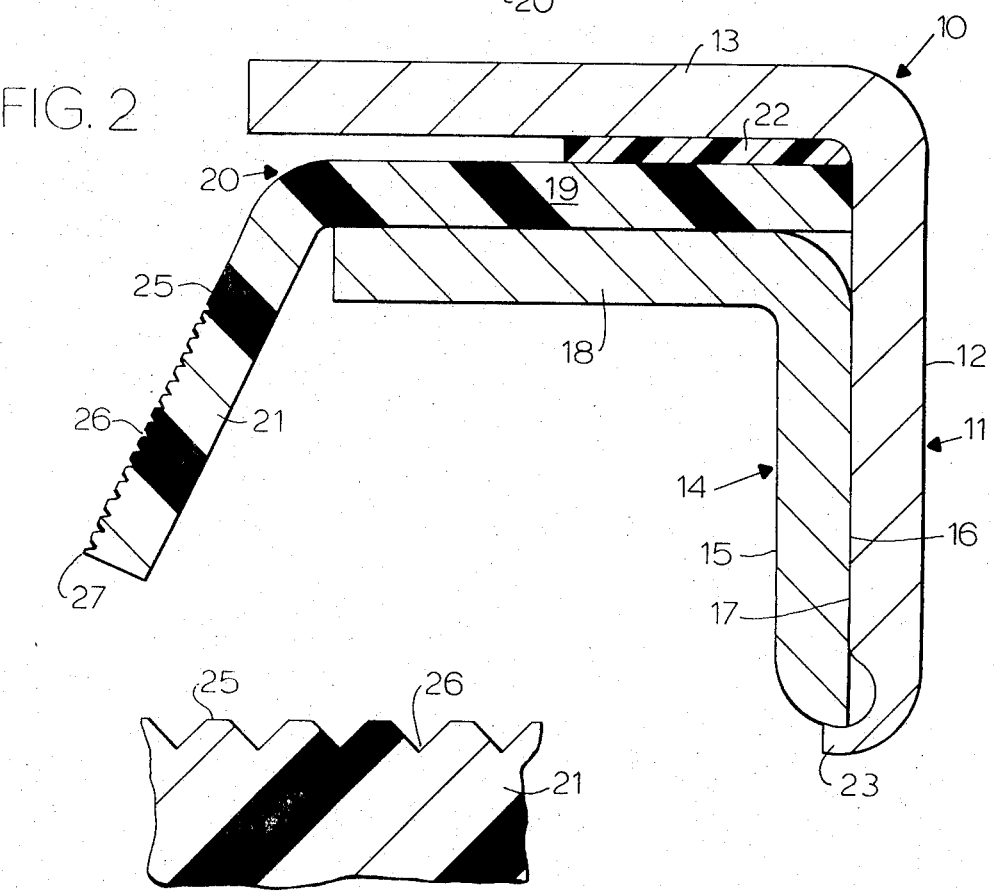
FIG. 2
FIG. 3

METHOD OF MAKING TETRAFLUOROETHYLENE SEALING ELEMENTS WITH HYDRODYNAMIC ACTION

BACKGROUND OF THE INVENTION

This invention relates to the manufacture of hydrodynamic seals from polytetrafluoroethylene and the like.

Polytetrafluoroethylene is a material which is not readily molded, as are the various synthetic rubbers, but which has some very desirable characteristics. In some uses, its ability to withstand high temperatures recommends its use as the oil sealing element which is in rotary contact with the shaft, instead of using one of the less temperature resistant synthetic rubbers. There are also other uses where this material would be advantageous, but heretofore its use has been greatly limited by its inability to be molded to desired shapes in an efficient manner. Normally it has to be sliced or stamped out from sheets or otherwise formed as a thin washer-like member rather than being molded into any desired shape. Therefore, it is expensive to manufacture.

The difficulty of molding this material has also made it impractical heretofore to make a hydrodynamic seal from polytetrafluoroethylene. Hydrodynamic seals have conventionally been made by molding a spiral groove or other hydrodynamic structure into the molded element. The washers have been difficult to handle, and such molding of polytetrafluoroethylene has been economically, at least, unfeasible.

SUMMARY OF THE INVENTION

This invention provides the desired hydrodynamic seal from materials such as polytetrafluoroethylene by a novel technique. First, a tubular billet is provided with an outer cylindrical surface and inner cylindrical surface of desired dimensions, leaving an annular cylindrical body of the polytetrafluoroethylene in between these two surfaces. Then to make sure that the beginning surface is flat and perpendicular to the cylindrical surfaces, one end wall is faced off to be exactly that.

This faced-off wall is then machined to provide a spiral groove that leads from the intersection of that wall with the inner cylindrical surface and extends out for a desired radial width, which will be determined by such a diameter that the groove would no longer be functionally required for the hydrodynamic action. After this machining, the washer of polytetrafluoroethylene is sliced off providing a washer having one surface with this machined spiral groove, and at the same time facing off the next surface. This next surface is then similarly grooved and a new slice is made, and this operation continues repetitively until the billet is consumed.

Each of the washers is then formed under pressure to deform permanently the radially inner portion of the washer to a frustoconical shape. The outer annular rim is left flat and planar. This makes it easy to assemble it into its case and provide a finished oil seal; in fact, the forming under pressure is preferably done during assembly of the oil seal.

Other objects and advantages of the invention will appear from the following description and from the drawings.

BRIEF DESCRIPTION OF THE DRAWINGS

In the drawings:

FIG. 1 is an end view of a radial type shaft seal embodying the principles of the invention.

FIG. 2 is an enlarged view in section taken through the seal along the line 2—2 in FIG. 1.

FIG. 3 is an enlarged view of a portion of the inner frustoconical lip of the polytetrafluoroethylene element of FIG. 2.

DETAILED DESCRIPTION OF A PREFERRED FORM

Figure 4:
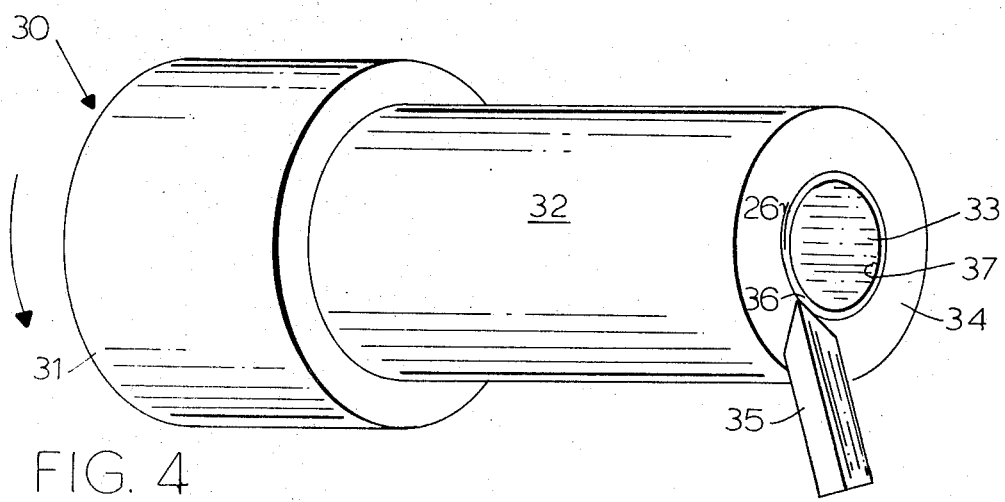
FIG. 4 is a view in perspective showing a billet with machined inner and outer diameters and with a lathe tool making a spiral groove on the faced-off end wall thereof.

FIG. 1 shows a completed radial shaft seal 10 embodying the principles of the invention, while FIG. 2 shows an enlarged cross-section of this radial shaft seal 10. The seal 10 has an outer case 11 having a cylindrical portion 12 and a radial flange 13. There is also an inner case 14 having a cylindrical portion 15 which nests in the cylindrical portion 12, so that the outer surface 16 of the portion 15 directly bears against the inner cylindrical wall 17 of the portion 12. The inner case 14 also has a radial flange 18. Between the radial flanges 13 and 18 is a flat radial outer portion 19 of a seal element 20, preferably made from polytetrafluoroethylene and which also has a frustoconical portion 21. A gasket 22 is preferably provided between the polytetrafluoroethylene member 20 and the radial wall 13, to insure sealing between the seal element 20 and the case 11. The radial flange 18 of the inner case 14 is forced toward the radial flange 13 of the outer case 11, so that the wall 18 compresses the portion 19 and holds it tightly and compresses the gasket 22 to prevent leakage and holds the polytetrafluoroethylene element 20 securely in the case; then the outer case 11 has an end portion 23 curled over to lock the inner case 14 tightly in that position. this general construction is, of course, well known.

The inner portion 21 of the polytetrafluoroethylene element 20 is frustoconical in shape and is provided with an air-side surface 25 having a spiral groove 26 leading outwardly from the innermost edge 27 of the seal. This groove 26 is made so that during rotation of the shaft in a particular direction, the groove tends to return any oil which may leak along the shaft, due to scratches in the shaft or minor imperfections in the shaft or even in the shaft sealing element itself, though most of the leakage occurs in this instance from the shaft imperfections. As in all hydrodynamic seals, the purpose of the groove 26 is to return the oil beneath the seal lip 27 and back to the oil side of the seal.

When the seal 10 is installed, there is shaft interference which flexes the inner portion 21 and makes a portion thereof substantially cylindrical for a short distance; that is why the spiral groove 26 extends a substantial distance along the face, because the degree of shaft interference is somewhat indeterminate.

The present invention provides for a novel method for making such a sealing element 20. FIG. 4 shows some of the early stages. First, a billet 30 of polytetrafluoroethylene is made. Usually this billet will not be exactly to the size desired but will have a somewhat-too-large outer generally cylindrical surface 31, which may be somewhat rough and inner cylindrical surface (not visible here) which is usually somewhat too small in diameter. The first step in the invention is to machine both the outer and inner surfaces to provide a desired, precisely dimensioned outer cylindrical surface 32 and a precise exactly dimensioned inner cylindrical surface 33. This may be done by machining the billet on a lathe. The entire billet 30 may be so machined, but, for the purpose of illustration, an end portion of the original size is shown. Leaving the billet on the lathe, the next step is to provide a flat end wall 34. This may be done by careful machining, making sure that it lies perpendicular to the cylindrical surfaces 32 and 33. Possibly, the billet 30 may already be provided with a suitable face, but, since this is usually not the case, the machining is usually necessary. This results in a sized hollow cylinder from which machining of the individual seal elements can now begin.

Using a properly formed tool 35 having a desired point 36 of the desired shape and size, the spiral groove 26 is machined into the face of the billet 30, starting at the inner edge 37 where the face 34 intersects the inner cylindrical surface 33 and extending far enough outwardly to provide for shaft tolerances and shaft interferences and to assure that there will be the desired action. This is carried, in other words, far enough so that from there out the presence of the groove 26 would no longer be functionally effective. The geometry of the cross section and the spiral angle of the groove 26 may be varied as desired to give the angles, etc., as needed.

Figure 5:
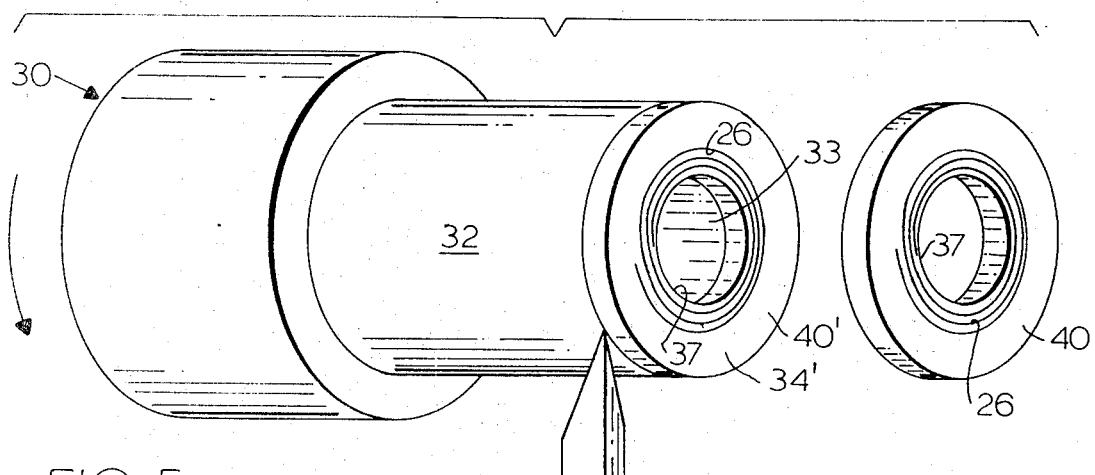
FIG. 5 is a view similar to FIG. 4 showing the slicing off of a washer having this machined groove.

After the grooving operation, a washer, wafer or element 40 is sliced from the billet 30 as shown in FIG. 5. The resulting wafer is now ready for the next step, but the slicing preferably provides the faced surface 34' of the next element 40' so that the operation may continue by simply slicing and machining, and slicing and machining, until the entire billet is consumed or the needed production is achieved.

Figure 6:
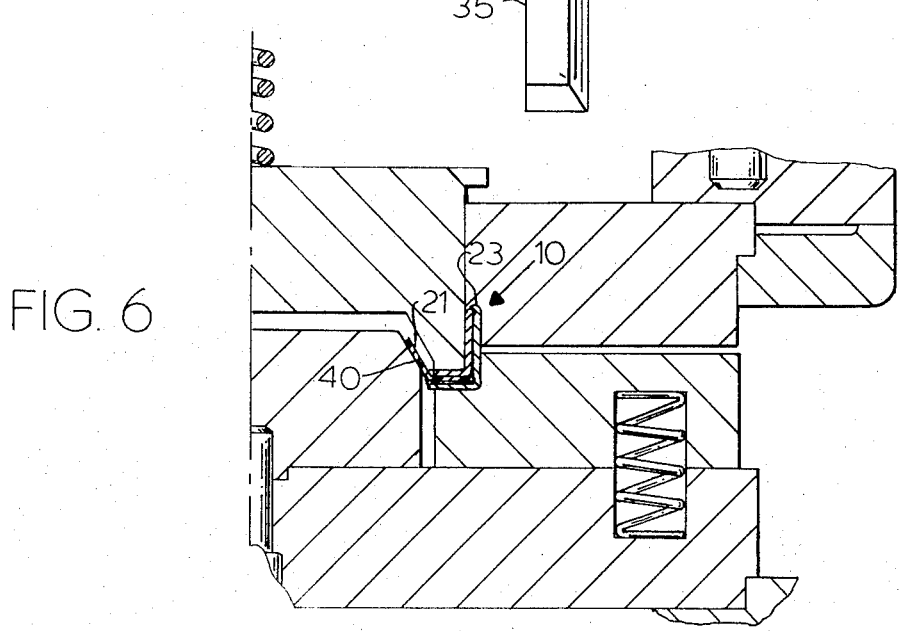
FIG. 6 is a view in perspective of a set of dies for forming the machined washer into the shape shown in FIG. 2, during assembly of the oil seal.

The element 40 is then ready for its next step, which is that of preforming, to produce the frustoconical angle. This may be done during assembly of the seal 10, as shown in FIG. 6, with sufficient pressure so that there is cold forming and so that the element 40 tends to hold this frustoconical shape on its inner portion 21. At the same time, the case portion 23 is curled over to hold the assembly 10 together. If the element is preformed before assembly in the case, the seal is completed, of course, by assembling the element into the case.

To those skilled in the art to which this invention relates, many changes in construction widely differing embodiments and applications of the invention will suggest themselves without departing from the spirit and scope of the invention. The disclosures and the description herein are purely illustrative and are not intended to be in any sense limiting.

I claim:

1. A method for manufacturing an oil seal element from polytetrafluoroethylene and the like from a tubular billet of polytetrafluoroethylene or the like having an outer cylindrical surface of a desired diameter, a concentric inner cylindrical surface of a desired diameter, and an annular body between said cylindrical surfaces, comprising the steps of:

facing-off one end wall perpendicular to said cylindrical surface, machining the faced end wall to provide a spiral groove leading from the intersection of said wall with said inner cylindrical surface and extending for a desired width, slicing said billet at a desired thin distance from said faced and machined end wall to provide a washer having a spiral groove on one surface and to provide a newly faced end wall which is therafter machined with a spiral groove prior to another slicing, and proceeding thusly through said billet to provide a plurality of said washers, each with a spiral groove on one surface.

2. The method of claim 1 with the additional step of forming each said washer under pressure to permanently deform the radially inner portion thereof to a frustoconical shape, leaving an outer annular rim that is planar.

3. The method of claim 2 wherein said forming is done simultaneously with assembly of the washer into a case structure completing an oil seal.

4. The method of claim 1 wherein the tubular billet is provided by first forming a roughly dimensional tubular billet and then machining both said cylindrical surfaces to the desired dimensions.

5. A method for manufacturing an oil seal element from polytetrafluoroethylene and the like, comprising the steps of:

providing a tubular billet of polytetrafluoroethylene or the like, machining said billet to provide an outer cylindrical surface of a desired diameter, a concentric inner cylindrical surface of a desired diameter, and an annular body between said cylindrical surfaces, facing-off one end wall perpendicular to said cylindrical surface, machining the faced end wall to provide a spiral groove leading from the intersection of said wall with said inner cylindrical surface and extending for a desired width, slicing said billet at a desired thin distance from said faced and machined end wall to provide a washer having a spiral groove on one surface and to provide a newly-faced end wall which is therafter machined with a spiral groove prior to another slicing, and proceeding thusly through said billet to provide a plurality of said washers, each with a spiral groove on one surface, and forming each said washer under pressure to permanently deform the radially inner portion thereof to a frustoconical shape, leaving an outer annular rim that is planar.

6. The method of claim 5 wherein said forming step is done simultaneously with the assembly of said washer between two clamping case members and the closing together of said case members to complete said seal.

* * * * *